Aug. 25, 1931.  E. J. CARLSON  1,820,436
MASON'S LEVELING TABLE
Filed May 5, 1930
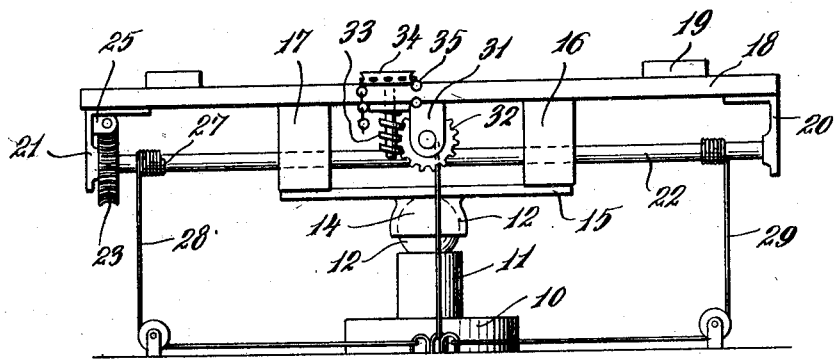
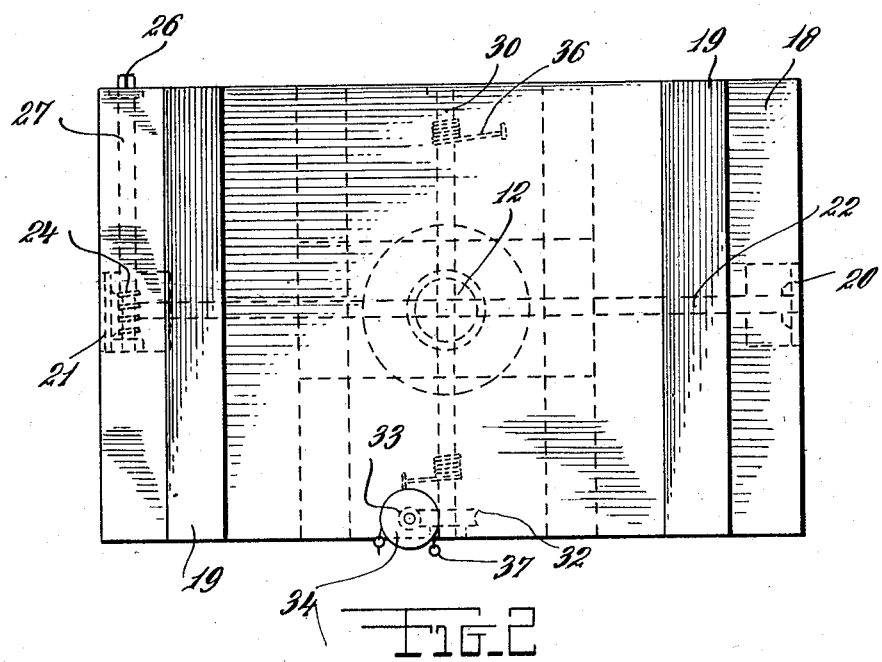
Inventor
E. J. Carlson
By his Attorney J. Ledermann Patented Aug. 25, 1931

1,820,436

UNITED STATES PATENT OFFICE

ERNEST J. CARLSON, OF READING, PENNSYLVANIA

MASON'S LEVELING TABLE

Application filed May 5, 1930. Serial No. 449,864.

The main object of this invention is to provide a table for stone cutters which may be tilted in any direction so that inclined or leveled faces may be formed by the hammer upon a block of stone.

Another object of the invention is to provide a stone cutter's table which is constructed in such manner as to permit the table proper to be adjusted to any degree of inclination within predetermined limits by the rotation of shafts located beneath the table.

The above and other objects will become apparent in the description below in which characters of reference refer to like-named parts in the drawings.

Referring briefly to the drawings, Figure 1 is a side elevational view of the leveling table.

Figure 2 is a top plan view of the same.

Referring in detail to the drawings, the numeral 10 indicates a base upon which a pedestal 11 is mounted. This pedestal is in turn surmounted by a ball 12 which registers in a hemispherical socket 13 of an inverted bell 14. The bell is formed integral with an apron 15, the latter being secured to a pair of spaced apart beams 16 and 17. The beams 16 and 17 support table boards 17 upon which rest slats 19, these slats being used for the purpose of resting such articles of work as a stone slab which is to be worked or surfaced. The table 18 on its ends is provided with a pair of brackets 20 and 21, one at each end. The brackets are suspended from the under side of said table and journal the ends of a rotatable spindle 22. Said rotatable spindle passes through the beams 16 and 17 and is journaled therein intermediate its length. One end of the spindle 22 lying adjacent the bracket 21 has a worm gear 23 mounted thereon which meshes with a worm 24. Said worm has one end journalled in an ear 25 and extends toward the side of the table. The projecting end 26 of the worm shaft 27 is squared so that a wrench or crank handle may be applied thereto, when it is desired to rotate the member 22. Adjacent the worm gear 23, the end 27 of a cable 28 is wound about the spindle 22 for a few turns. This cable is suspended tangentially from one side of the spindle 22 and secured at a convenient position to the support surface of the device. Near the opposite end of the spindle 22 a second cable 29 is secured to the spindle and is trained a few turns about the same and suspends tangentially from the opposite side of the spindle so that as the cable 28 takes up the cable 29 pays out. This arrangement will permit inclination of the table 18 in one direction. A second auxiliary spindle 30 is journaled in brackets 31. These brackets are arranged at opposite sides of the table and depend from the latter. Near one end of the auxiliary spindle 30 a worm gear 32 is mounted. This worm gear meshes with a second worm 33 to one end of which is attached a chain wheel 34 which is adapted to be rotated by a chain 35. A pair of cables 36 and 37 are suspended tangentially from opposite sides of the auxiliary spindle 30.

The device is adapted to incline the table in either direction. When rotating the worm shaft 27, the table is tilted in one direction through the medium of the worm gear 23 turning the spindle 22. The table will shift upon the ball 12 when this occurs and will either tilt the table into one or the other inclined position. By rotating the chain wheel 34, the auxiliary spindle 30 is rotated, thus inclining the table in the other direction.

It is to be noted that certain changes in form and construction may be made without departing from the spirit and scope of the invention.

I claim:

In a device of the class described, a table, a bell rigid with said table, a pedestal, a ball surmounting said pedestal registering in said bell, spindles beneath said table, cables wound about said spindles, said cables being adapted to alternately take up or pay out on said spindles and means for rotating said spindles to take up or pay out said cable to incline said table.

In testimony whereof I affix my signature.

ERNEST J. CARLSON.